Figure 2:
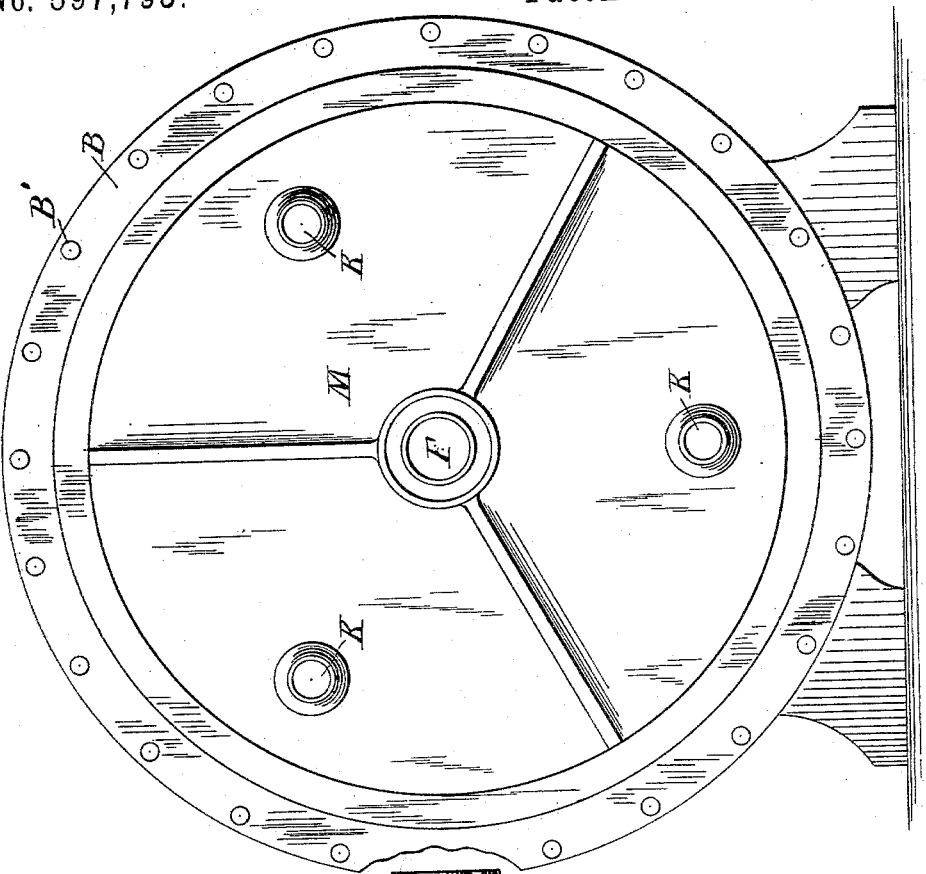

(No Model.) 6 Sheets—Sheet 1.

P. B. TAYLOR.
ROTARY ENGINE.

No. 597,793. Patented Jan. 25, 1898.

Attest:
L. Lee.
Edw. F. Kinsey

Inventor.
Percy B. Taylor, per
Thomas J. Crane, Atty.

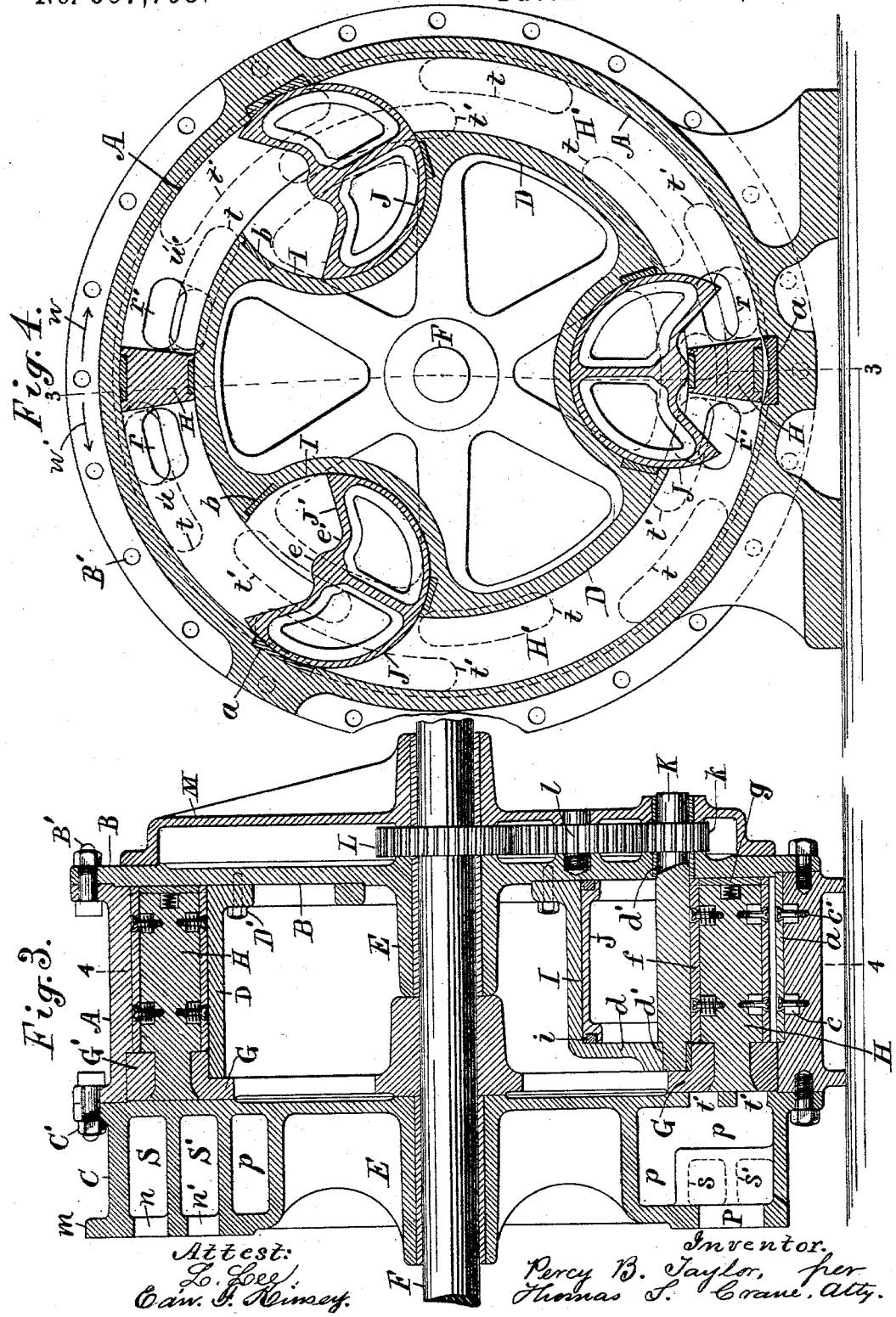

(No Model.) 6 Sheets—Sheet 3.
P. B. TAYLOR.
ROTARY ENGINE.
No. 597,793. Patented Jan. 25, 1898.
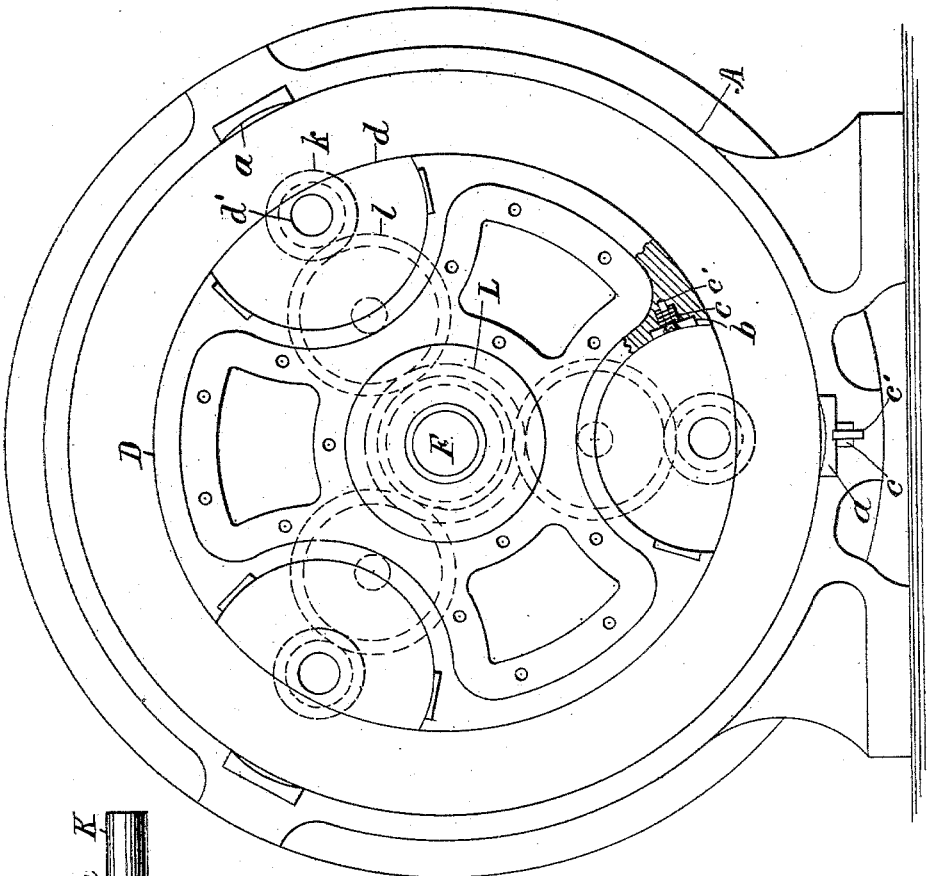
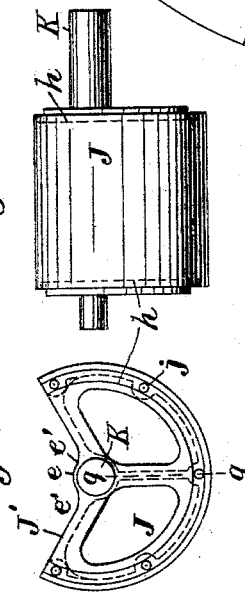
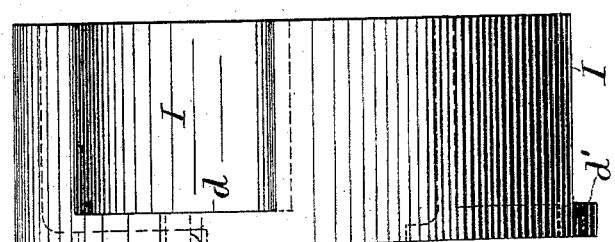
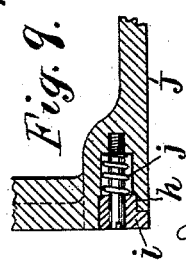
Attest:
L. Lee.
Edw. F. Kinsey.
Inventor
Percy B. Taylor, per
Thomas S. Crane, Atty.

(No Model.)  P. B. TAYLOR.  6 Sheets—Sheet 4.
ROTARY ENGINE.

No. 597,793.  Patented Jan. 25, 1898.

Attest:
L. Lee
Edw. F. Kinsey

Inventor.
Percy B. Taylor, per
Thomas S. Crane, Atty.

(No Model.) 6 Sheets—Sheet 5.
P. B. TAYLOR.
ROTARY ENGINE.
No. 597,793. Patented Jan. 25, 1898.
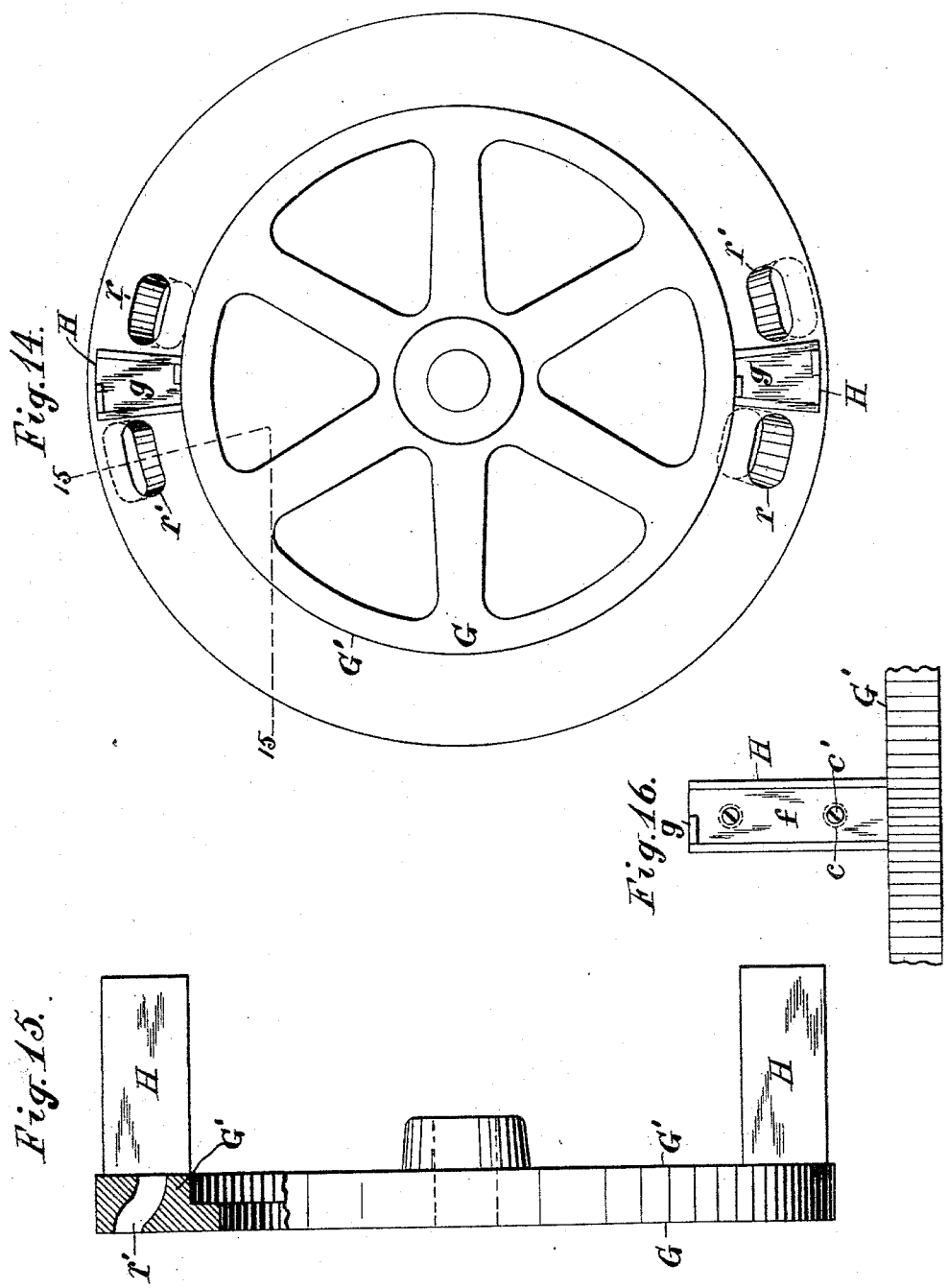
Attest:
L. Lee.
Edw. F. Kinsey.
Inventor.
Percy B. Taylor, per
Thomas S. Crane, Atty.

(No Model.) 6 Sheets—Sheet 6.
P. B. TAYLOR.
ROTARY ENGINE.
No. 597,793. Patented Jan. 25, 1898.
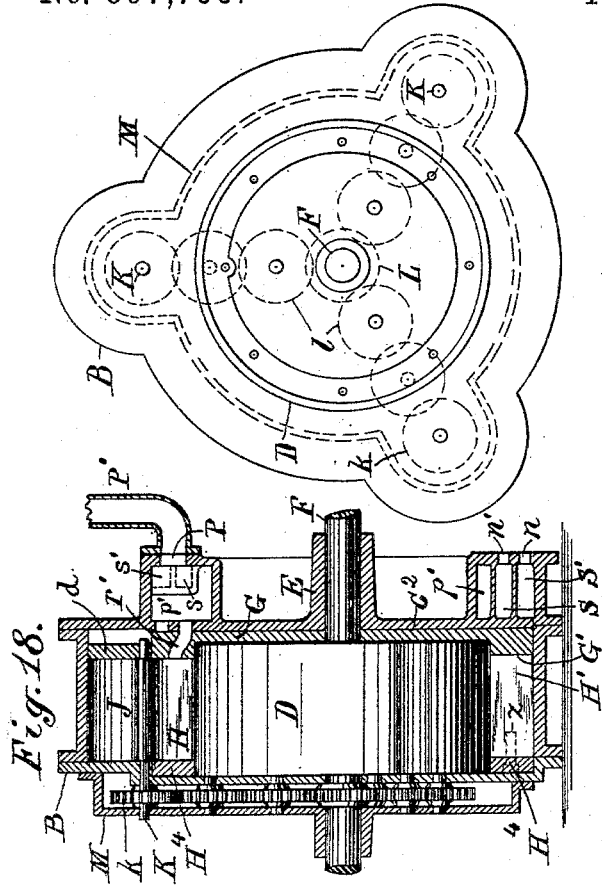
Fig. 19.
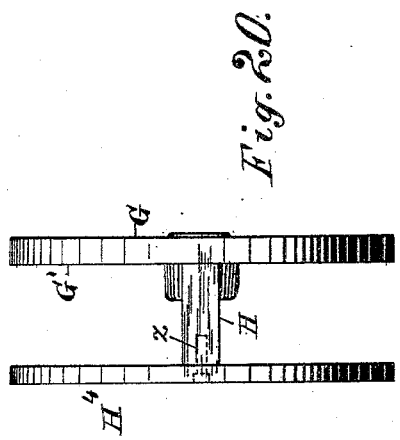
Fig. 20.
Fig. 18.
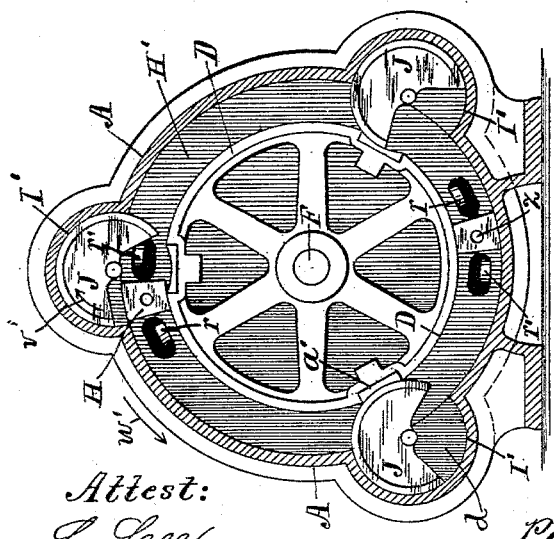
Fig. 17.
Attest:
L. Lee,
Edw. F. Kinsey.
Inventor.
Percy B. Taylor, per
Thomas S. Crane, Atty.

UNITED STATES PATENT OFFICE.

PERCY B. TAYLOR, OF NEWARK, NEW JERSEY.

ROTARY ENGINE.

SPECIFICATION forming part of Letters Patent No. 597,793, dated January 25, 1898.

Application filed March 27, 1897. Serial No. 629,526. (No model.)

*To all whom it may concern:*

Be it known that I, PERCY B. TAYLOR, a citizen of the United States, residing at Newark, county of Essex, State of New Jersey, have invented certain new and useful Improvements in Rotary Engines, fully described and represented in the following specification and the accompanying drawings, forming a part of the same.

The present invention relates to that class of rotary engines in which rectangular pistons are projected from the side of a rotary disk and are moved in an annular channel which is provided with abutments to be opened as the piston is advanced and then actuated to close the channel behind the same.

In the present invention the rotary disk is perforated by a steam-duct adjacent to the piston and is used in connection with a stationary valve-plate having suitable steam inlet and outlet ports to introduce the steam to and remove it from an annular channel between the piston and the abutments.

In this invention a stationary drum or hub is attached to one head of the cylinder concentric therewith to form the annular channel, which is provided with longitudinal semicylindrical recesses in which cylindrical abutments are rotated, such abutments having a notch in one side which is turned toward the piston as it passes such abutment. The cylindrical abutments can be actuated by oscillating the same; but I prefer to rotate them continuously, as such a movement is easily produced by gearing from the main shaft of the engine to the spindles of the cylindrical abutments, and such continuous rotation enables me to dispense entirely with reciprocating and oscillating parts upon the engine. The recesses for the abutments may be made upon the inner or outer side of the channel, and the abutments are preferably projected across the channel into the opposite wall of the cylinder, in which a packing-strip is fitted. Packing-strips are also applied to the edges of the cylindrical recess, so that the joint between the drum and the cylinder is perfectly steam-tight when the channel is closed. The cylinder is provided upon one end with a head, to which the hub is rigidly attached, and at the other end with a steam-distributing chamber having an inlet for steam and an outlet for exhaust, with passages extended inside the chamber and ports from such passages through the valve-plate. The disk is fitted snugly between the end of the hub and the steam-chamber, making a steam-joint with the chamber, whose contiguous face is provided upon a line concentric with the duct, with a series of alternate inlet and outlet ports connected, respectively, with the steam and exhaust openings upon the chamber.

In a reversing-engine of this construction the distributing-chamber has two sets of passages extended from the steam-inlet within the chamber and the ports open upon concentric lines contiguous to the disk, and the disk is perforated with a duct at each side of the piston to connect with such openings. To effect this arrangement, the ducts are extended through the disk upon the outer side at different distances from the center of the disk, and thus move successively over the two concentric series of inlet and outlet ports upon the distributing-chamber. The disk may be provided with any desired number of pistons; but I prefer to use two pistons and three of the abutments, one of the pistons being thus constantly exposed to the effect of steam-pressure. The length of the steam-inlets is so proportioned to the travel of the piston between the abutments as to use the steam expansively, and this is effected in the same degree in a reversible engine, whether the engine be rotated forward or backward. The reversible engine is thus adapted for use economically in many situations where it is constantly reversed. Such a reversible engine is shown in the annexed drawings, in which—

Figure 1:
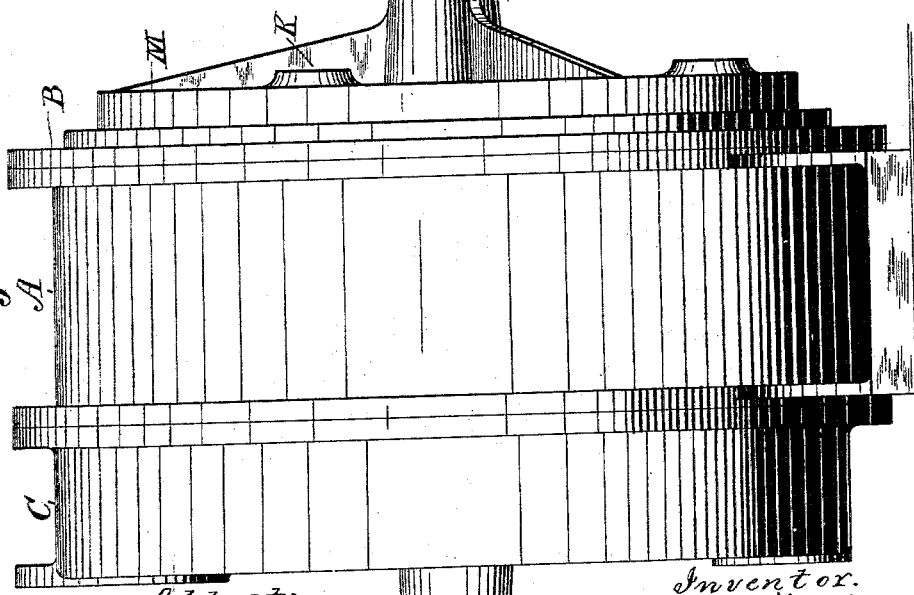
Figure 10:
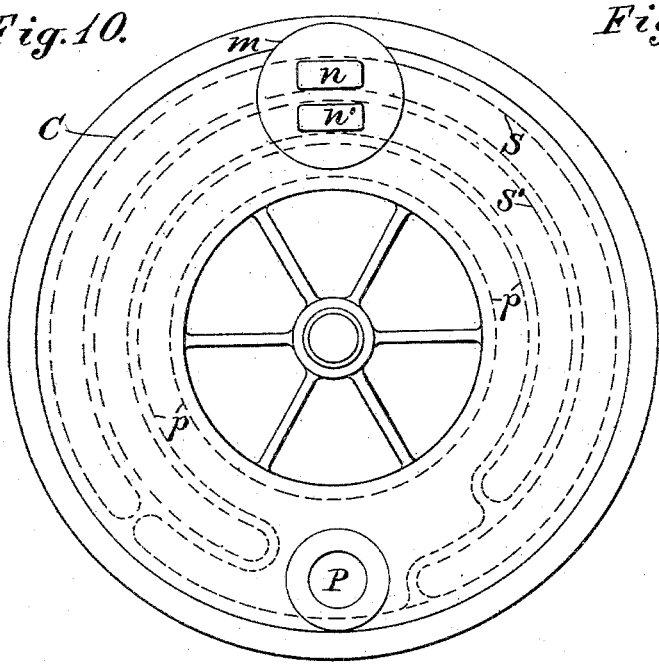
Figure 11:
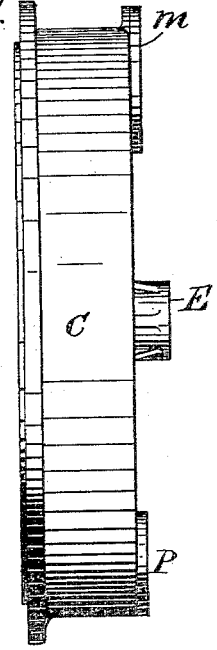
Figure 12:
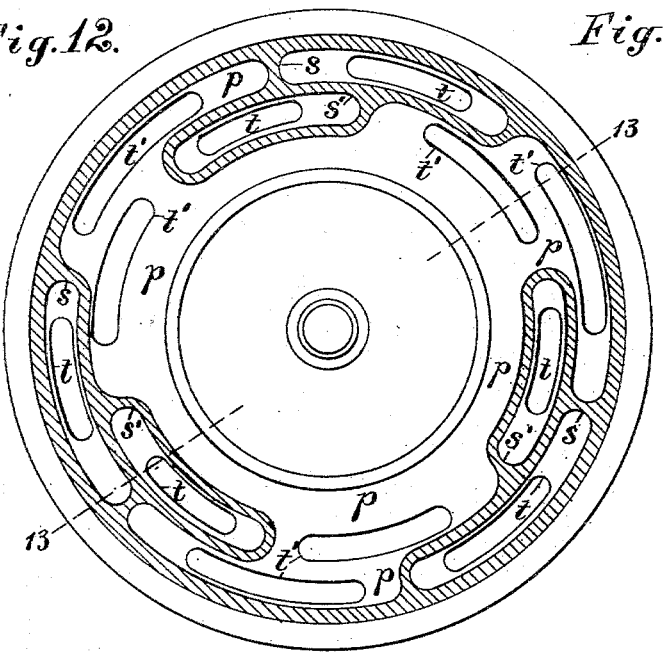
Figure 13:
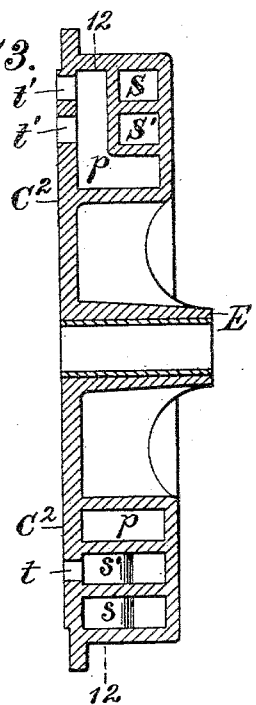

Figure 1 is a side elevation of the engine. Fig. 2 is an end elevation of the cylinder-head with cover containing the gearing. Fig. 3 is a longitudinal section where hatched upon center of Fig. 4. Fig. 4 is a transverse section on line 4 4 in Fig. 3, looking toward the distributing-chamber. Fig. 5 is an end view of the engine with the distributing-chamber and disk removed, with the pistons and abutments omitted from the view to exhibit the other parts more clearly. Fig. 6 is an edge view of the hub detached from the head. Fig. 7 is an end view, and Fig. 8 a side view, of one of the cylindrical abutments with the end packings removed. Fig. 9 is a section of one of the packings and the contiguous parts upon line 9 9 in Fig. 7, the view being drawn upon an enlarged scale to exhibit the construction of the packing. Fig. 10 shows the outside of the distributing-chamber, with dotted lines showing the steam and exhaust passages. Fig. 11 is an edge view of such chamber. Fig. 12 is a vertical section of the distributing-chamber on line 12 12 in Fig. 13, looking toward the inner side of the chamber, to exhibit the steam-ports. Fig. 13 is a vertical section on line 13 13 in Fig. 12. Fig. 14 shows the inner side of the disk to which the pistons are attached. Fig. 15 is an edge view of the disk, partly in section, through one of the ducts on line 15 15 in Fig. 14; Fig. 16, an outside view of one of the pistons with the adjacent portion of the disk. Fig. 17 shows an engine with the head removed, having the recesses at the outside of the channel. Fig. 18 is a vertical section of the same where hatched at the center line. Fig. 19 shows the inner side of the head; and Fig. 20, an edge view of the disk, pistons, and stiffening-ring.

The cylinder A is shown with a head B attached at one end by bolts B' and the distributing-chamber C attached at the opposite end by bolts C'. The hub D consists of a species of drum which is attached to the head B by flange and bolts D' and is open at the opposite end adjacent to the chamber C. The head and chamber are provided with bearings E, and the engine-shaft F is fitted to turn therein and provided with the disk G, from which the pistons H are projected into the annular channel H', between the hub and cylinder. Semicylindrical recesses I are extended nearly across the face of the hub from the head B, the farther ends of the recesses being formed with plates $d$. Bearings $d'$ are formed in the plate and head within the peripheral line of the hub, and therefore wholly at one side of the channel H'. Cylindrical abutments J, having spindles K journaled in such bearings, are fitted to the recesses $i$, and the recesses and abutments are so proportioned that the abutment may extend across the channel and intersect the periphery of the cylinder sufficiently to form a curved joint therewith by means of yielding packing $a$.

Where the abutment extends merely across the channel it cannot be provided with a packing fitted to the cylindrical surface of the abutment, as the radius of the abutment is much smaller than that of the channel and the packing would therefore project into the channel and interfere with the passage of the piston; but the penetration of the opposite wall of the channel by the abutment affords an opportunity to introduce the packing $a$, which may thus be accurately fitted to the surface of the abutment without projecting into the channel. The concavity opposite each of the recesses is necessarily concentric therewith. Packings $b$, Fig. 5, are fitted to longitudinal grooves in the cylindrical recesses near their edges, and the packings $a$ and $b$ (see Figs. 3 and 5) are pressed outwardly by springs $c$ and are restricted in their outward movement by retaining-screws $c'$. A longitudinal notch J' is formed in one side of the cylindrical abutment, with sides extended inwardly to a ridge $e$ upon the bottom of the notch, with grooves $e'$ at opposite sides of such ridge, which are adapted to clear the inner corners of the piston as it moves past the abutment while the latter is rotating. The ridge is in practice constructed in line with the periphery of the hub D, but it is not intended to form a joint with the piston, as the steam-pressure is discharged from the channel when the piston passes the abutment. A steam-joint could not be maintained with the construction shown, as the piston cannot contact with the concave surface of the packing-strip $a$, which is curved to correspond with the rotary abutment as the outer side of the piston is curved to correspond with the cylinder A.

The outer and inner sides of the piston are grooved to receive packing-strips $f$, and the end of the piston is also grooved radially to receive a packing-strip $g$, and the strips $f$ and $g$ are half lapped where they intersect one another, as shown upon the end of the piston in Fig. 16. The packings $f$ are provided with the springs $c$ and rotating screws $c'$, the strips being recessed loosely about the heads of the screws to permit a slight outward movement of the packings to hold them steam-tight against the walls of the channel H', but preventing the displacement of the packings when passing the abutments. The packing $g$ moves constantly in contact with the head B and requires merely a spring to force it outward, as shown in Fig. 3. The opposite ends of the abutment are formed with rabbeted grooves $h$, as shown in Figs. 3, 7, 8, and 9, and rabbeted rings $i$ are fitted thereto and pressed outwardly by springs $j$. These packings contact respectively with the head B and the plate $d$ at the opposite ends of the semicircular recess I, and similar packings may be fitted radially to the ends of the abutments along the edges of the notch J'.

The disk E is fitted steam-tight between the contiguous end of the hub D and the inner face of the chamber C, and is provided with an annular projection G', which projects into the channel H' for the thickness of the plates $d$, so as to contact with the ends of the abutments. Such ring or projection G' narrows the annular channel H to the same length as the abutments, thus making the pistons of the same length as the abutments and channel.

To operate the engine reversibly, two ducts $r$ and $r'$ are extended through the ring upon opposite sides of each piston to connect with ports $t$ and $t'$ upon the contiguous valve-face $C^2$ upon the chamber C. The chamber, as shown in Figs. 10 to 13, inclusive, is provided with two annular passages S and S', which in general extend half-way across the thickness of the chamber and have at intervals pockets $s$ and $s'$, projected therefrom to the inner wall of the chamber. Inlet-openings $n$ and $n'$ are extended from a seat $m$ upon the chamber into these passages, and these openings would be connected with a three-way steam-cock in such manner as to direct the live steam into either of such passages at pleasure, and thus supply steam through ports $t$ to the ducts $r$ and $r'$.

The space within the distributing-chamber C which is not occupied by the passages S and S' and the pockets $s$ and $s'$ forms an exhaust-passage $p$, connected with an outlet-opening P, and such exhaust-passage extends between the pockets to connect with exhaust-ports $t'$. The ports $t$ and $t'$ are arranged alternately upon two concentric circles and are made of such length as to supply the steam to the space between each piston and abutment during about one-third of its travel from one abutment to the next, the steam expanding during the greater part of the remaining travel and being then discharged by the connection of the port $r$ or $r'$ with one of the ports $t'$. The steam is directed into the duct $r$ by supplying the channel S through the inlet-opening $n$ and then operates to drive the pistons in the direction of the arrow $w$ in Fig. 4, while the introduction of the steam into the duct $r'$ (by connecting the supply with the inlet $n'$) reverses the engine by driving the pistons in the opposite direction, as indicated by the arrows $w'$.

The degree of expansion is determined by making the steam-ports $t$ of the required length, and the engine operates with equal efficiency when rotating in either direction. It will be observed in Fig. 3 that the journals $d'$ of the abutments are journaled wholly at one side of the channel, so that the ring G' may pass over the inner journal, which is formed in the plate $d$ at one end of the semicircular recess I. The same effect may be produced by forming the semicircular recesses upon either the inner or outer side of the channel H'.

Figs. 17 to 19, inclusive, show the abutments arranged with their spindles upon the outer side of the channel H', the recesses I' being formed in the cylinder A and the concavities, which are provided with the packings $a'$, being formed upon the periphery of the drum D. In this construction the plate $d$ supports one journal of the abutment and the head B supports the other journal, the same as the head and plate shown in Fig. 3.

The outer ends of the abutment-spindles K are provided with cog-wheels $k$, and the shaft F is provided with cog-wheel L, and intermediate cog-wheels $l$ connect the wheels $k$ and L, thus rotating all the abutments synchronously, and the latter are so adjusted as to admit each piston as it approaches to the notch J' in the abutment, as shown at the upper part of Fig. 17, and to hold such notch continuously toward the piston as it travels past the semicylindrical recess I, as shown at the lower part of Fig. 4. The rotation of the abutment during such movement of the piston operates to close the channel H' as soon as the piston has passed such recess, as will be evident by reference to the arrows $w'$ and $v'$ in Fig. 17, representing the movement of the piston and abutment, respectively, and the periphery of the abutment holds the channel thus closed so long as the steam-pressure is operating upon the piston.

The sides of the notch J' in each abutment are of similar length and are at all times exposed to equal pressure when the steam is confined in the channel and the pressure upon the abutment is thus balanced, so as to produce no resistance to its rotation. The intersection of the side of the channel by the abutment where it contacts with the packing $a$ in Fig. 4 and $a'$ in Fig. 17 affords the means to produce a tight-packed joint, which cannot be effected where the surfaces have merely a rolling or tangential contact, and the construction thus furnishes a tight and durable abutment.

In Figs. 18 and 20 the outer ends of the pistons H are shown tied together by a balancing-ring $H^4$, which operates also to hold the outer ends of the pistons from deflection under the steam-pressure. Where such ring is employed, the hub D is made of sufficient width, as shown in Fig. 18, to admit the ring next the head B, and the abutments J are constructed to rotate between the rings G' and $H^4$, the packings $i$ upon the ends of the abutments making steam-tight joints with both of such rings. To avoid the use of stuffing-boxes upon the outer journals of the abutment-spindles K, they are inclosed, with the gearing used to rotate the abutments, in a hollow cover M, as shown in Figs. 1, 2, 3, 18, and 19. Without such balancing-ring, as with the design shown in Fig. 3, it is obvious that the steam operating in the channel H' produces an unbalanced pressure upon the inner face of the ring G' and crowds such ring against the valve-face $C^2$. With the ring $H^4$ attached to the outer ends of the pistons H, as by the screws $z$, Figs. 17, 18, and 20, the pressure upon the inner side of the ring $H^4$ balances the pressure of the steam upon the ring G', as the two rings form the opposite ends of the channel. The ring $H^4$ thus performs the double function of balancing the ring G' and of stiffening the pistons H.

The ports $t$ are shown in the drawings of such length as to admit steam for about one-third of the piston's travel between each pair of abutments, which proportion is suitable for a reversing-engine to be used for hoisting purposes, in which constructions a great amount of power is preferred for an engine of given size rather than high efficiency in the use of the steam.

It will be readily understood that the ports $t$ may be made shorter and the steam expanded for a greater proportion of the stroke, and it will also be understood that by the use of two abutments only (upon opposite sides of the cylinder) the arc through which the pistons travel is increased in length and the ratio of expansion can therefore be greater. It is also obvious that the construction shown in the drawings may be used with additional means adapted to cut off the steam at any desired point in the travel of the pistons. I have therefore claimed my constructions without reference to the proportions of the parts, as such matters are readily varied by the constructor to suit varying circumstances.

Having thus set forth the nature of the invention, what I claim herein is—

1. A rotary engine comprising a cylinder with concentric hub forming an annular channel having semicylindrical recesses in one side and concentric concavities in the opposite side of the channel, a rotary disk carrying a rectangular piston in said channel, cylindrical abutments fitted within the semicylindrical recesses and penetrating into the said concavities, yielding packings applied to such concavities, and fitted to the cylindrical surface of the abutment, and the said abutments having each an external notch to permit the passage of the piston, and a spindle journaled wholly at one side of the channel, substantially as herein set forth.

2. A rotary engine having a cylinder with concentric hub forming an annular channel with semicylindrical recesses in one side of the channel, a rotary disk carrying two or more rectangular pistons in said channel with a ring attached to the ends of such pistons, and cylindrical abutments fitted to the semicylindrical recesses and rotated across the channel between the said disk and ring, and the abutments having an external notch upon one side to permit the passage of the piston, and having each a spindle journaled wholly at one side of the channel, as and for the purpose set forth.

3. A rotary engine having a cylinder with concentric hub forming an annular channel with semicylindrical recesses in one side of the same, a rotary disk carrying a rectangular piston in said channel, and cylindrical abutments fitted to said recesses and rotated continuously therein, and notched to permit the passage of the piston, the disk having a steam-duct at the side of the piston, and the cylinder having a steam-distributing chamber with valve-face fitted to the outer side of the disk with suitable inlets and outlets to admit steam to and from said duct, substantially as herein set forth.

4. A rotary engine having a cylinder with concentric hub forming an annular channel with semicylindrical recesses in one side of the same, a rotary disk carrying a rectangular piston in said channel, and cylindrical abutments fitted to said recesses and rotated continuously therein, and notched to permit the passage of the piston, and having spindles journaled wholly at one side of the channel, the disk having a steam-duct at the side of the piston, and the cylinder having a steam-distributing chamber with valve-face fitted to the outer side of the disk, the chamber having an inlet for steam and an outlet for exhaust, with passages extended within the chamber, and ports leading steam to and from such passages to the duct in the disk, as and for the purpose set forth.

5. A rotary engine having a cylinder with concentric hub forming an annular channel with semicylindrical recesses in one side of the same, a rotary disk carrying a rectangular piston in said channel, and cylindrical abutments fitted to said recesses and rotated continuously therein, and notched to permit the passage of the piston, and having spindles journaled wholly at one side of the channel, the disk having a steam-duct at the side of the piston, and the cylinder having a steam-distributing chamber with valve-face fitted to the outer side of the disk, the chamber having an inlet for steam and an outlet for exhaust, with passages extended within the chamber, and ports extended alternately from the steam and exhaust passages through the valve-plate, to supply steam and receive it from the duct in the disk, as and for the purpose set forth.

6. A reversible rotary engine having a cylinder with concentric hub forming an annular channel with semicylindrical recesses in one side of the same, a rotary disk carrying a rectangular piston in said channel, and cylindrical abutments fitted to said recesses and rotated continuously therein, and notched to permit the passage of the piston, and having spindles journaled wholly at one side of the channel, ducts through the disk at different distances from its center and upon opposite sides of the piston, and the cylinder having a steam-distributing chamber with valve-face fitted to the outer side of the disk, the chamber having an inlet for steam and an outlet for exhaust, two sets of passages extended from the steam-inlet within the chamber, and two concentric series of ports connecting the said passages with the two ducts at opposite sides of the piston, as and for the purpose set forth.

7. A rotary engine having a cylinder with a concentric hub forming an annular channel with semicylindrical recesses in one side of the same, a rotary disk carrying a rectangular piston in said channel, and cylindrical abutments fitted to said recesses and rotated continuously therein, and notched to permit the passage of the piston, and having spindles journaled wholly at one side of the channel, the disk having a steam-duct at the side of the piston, and the cylinder having upon one end a head, and upon the opposite end a steam-distributing chamber with valve-face fitted to the outer side of the disk, with suitable inlets and outlets to admit steam to and from said duct, bearings supporting the engine-shaft in the center of the cylinder, and cog-wheels connecting such shaft with the spindles of the cylindrical abutments, as and for the purpose set forth.

8. A rotary engine having a cylinder with concentric hub forming an annular channel, a rotary disk carrying a rectangular piston in said channel, the channel having on one side semicylindrical recesses with cylindrical abutments rotated therein, and having spindles journaled upon the side of the channel, and the disk having a steam-duct at the side of the piston, and the cylinder having upon one end a steam-distributing chamber with valve-face fitted to the outer side of the disk, and an inlet for steam and an outlet for exhaust, with passages extending within the chamber, and ports leading steam to and from such passages to the duct in the disk, and the cylinder having upon the opposite end a head with cover forming a gearing-chamber, bearings in the center of the distributing-chamber and head, for the engine-shaft, and cog-wheels within the cover connecting the engine-shaft with the spindles of the cylindrical abutments, as and for the purpose set forth.

9. A rotary engine having a cylinder provided upon one end with the head B and upon the opposite end with a steam-distributing chamber, as set forth, the hub D provided with semicylindrical recesses having each at one end the plate $d$, notched cylindrical abutments fitted to such recesses, with their spindles journaled in such plates and in the head B, bearings upon the head and the distributing-chamber, with engine-shaft fitted thereto and connected by cog-wheels with the said spindles, and the disk G fitted between the end of the hub and the distributing-chamber, and provided with the annular projection G' carrying the piston H in the annular channel between the hub and cylinder, and the disk and distributing-chamber having ducts and ports to introduce and remove the steam from said channel, substantially as herein set forth.

10. In a rotary engine having a cylinder provided upon one end with the head B, and upon the opposite end with steam-distributing chamber, as set forth, and having concentric channel H' provided with semicylindrical recesses having each the plate $d$ at one end and the head B at the opposite end, and a rotary disk carrying a rectangular piston in the channel between the hub and cylinder, the combination, with the cylindrical abutment J having the rabbeted grooves $i$ in its ends, of the rabbeted rings $j$ fitted to such grooves and provided with springs and retaining-screws as set forth, and operating to pack the end of the cylindrical abutment against the plate and head respectively, substantially as herein set forth.

11. In a rotary engine of the class herein described, the combination, with the cylinder A, having concentric channel with semicylindrical recesses, and rectangular piston moving in the channel between such cylinder and hub, of cylindrical abutments fitted to such recesses and having each its spindle journaled wholly at one side of the channel, and each abutment having notch J' in one side with ridge $e$ in the bottom coincident with the periphery of the channel, and having grooves $e'$ extended at each side of such ridge to clear the inner corners of the piston, substantially as herein set forth.

In testimony whereof I have hereunto set my hand in the presence of two subscribing witnesses.

PERCY B. TAYLOR.

Witnesses:
 FRANCIS S. CURRIER,
 THOMAS S. CRANE.